United States Patent [19]

Hart et al.

[11] Patent Number: 4,531,787
[45] Date of Patent: Jul. 30, 1985

[54] DEBRIS DEFLECTOR FOR ENDLESS TRACK SYSTEM

[75] Inventors: Cullen P. Hart, Peoria; Wayne A. Klopfenstein, Laura, both of Ill.

[73] Assignee: Caterpillar Tractor Co., Peoria, Ill.

[21] Appl. No.: 245,235

[22] PCT Filed: Dec. 2, 1980

[86] PCT No.: PCT/US80/01605

§ 371 Date: Dec. 2, 1980

§ 102(e) Date: Dec. 2, 1980

[87] PCT Pub. No.: WO82/01858

PCT Pub. Date: Jun. 10, 1982

[51] Int. Cl.³ .............................................. B60S 1/62
[52] U.S. Cl. .................................. 305/12; 280/158 R
[58] Field of Search ............... 305/8, 9, 12, 34, 11; 280/158 R, 158 A

[56] References Cited

U.S. PATENT DOCUMENTS

| | | | |
|---|---|---|---|
| 699,098 | 4/1902 | Bryson . | |
| 1,130,117 | 3/1915 | Strait . | |
| 1,310,406 | 7/1919 | Adams | 305/12 |
| 1,741,878 | 12/1929 | Rasmussen | 305/12 |
| 1,992,702 | 2/1935 | Koop | 305/12 |
| 2,082,693 | 6/1937 | Flynn | 305/12 |
| 2,157,253 | 5/1939 | Yetter | 280/158 |
| 2,326,486 | 8/1943 | Norelius | 305/9 |
| 2,560,307 | 7/1951 | Slemmons | 305/8 |
| 3,082,044 | 3/1963 | Klemm et al. | 305/12 |
| 3,127,190 | 3/1964 | Thesmar | 280/158 R |
| 3,736,032 | 5/1973 | Mosshart et al. | 305/34 |
| 3,861,762 | 1/1975 | Freedy et al. | 305/12 |
| 4,198,103 | 4/1980 | Ward et al. | 305/12 |
| 4,235,479 | 11/1980 | Puglise | 305/12 |

*Primary Examiner*—Charles A. Marmor
*Attorney, Agent, or Firm*—Richard F. Phillips

[57] ABSTRACT

This invention concerns a debris deflector (30) primarily useful for vehicles (24) having wheels (14,16) supporting an endless track (12). With no deflector (30) debris accumulates in the endless track (12) impeding vehicle performance. An inverted "V"-shaped elastomeric deflector (30) is connected to the vehicle (24) so as to be situated between front and rear wheels (14,16). The upper ridge (34) of the inverted "V" is parallel to the longitudinal axis of the vehicle (24). As debris falls from an upper portion of the endless track (12) it strikes the deflector (30) and is deflected out of the endless track (12). The deflector (30) has front and rear edge portions adjacent, respectively, tread surfaces (18) of the front and rear wheels (14,16) for scraping debris from tread surfaces (18) of said wheels (14,16).

10 Claims, 2 Drawing Figures

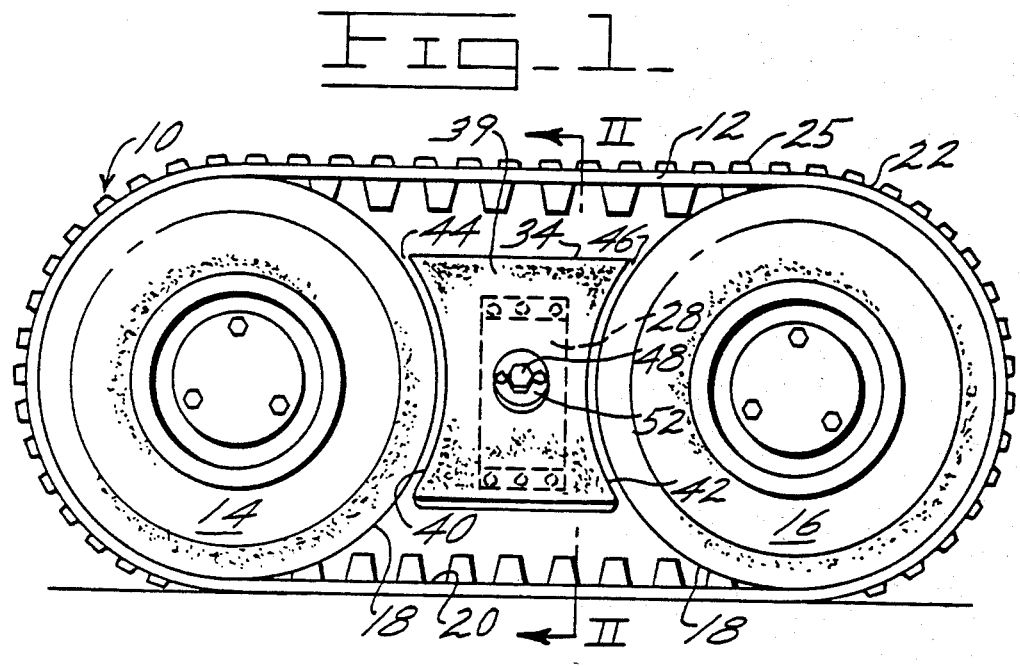
Fig_1_
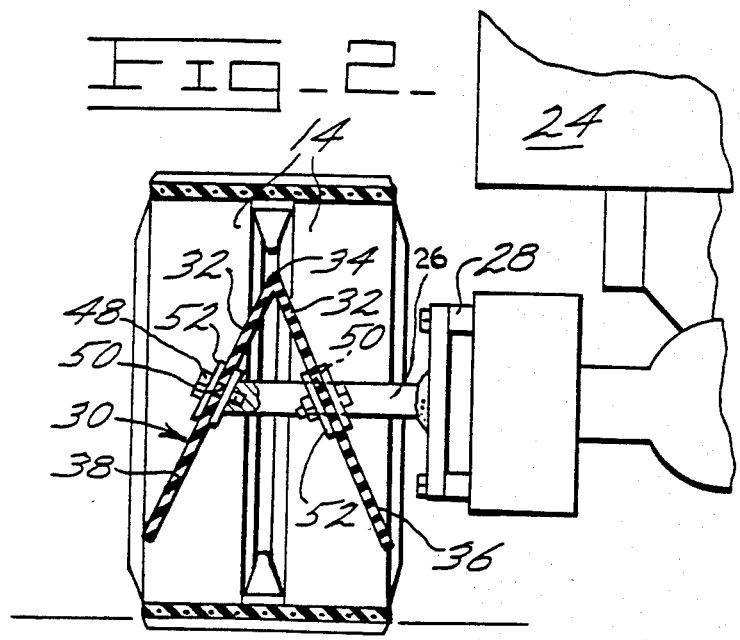
Fig_2_

DEBRIS DEFLECTOR FOR ENDLESS TRACK SYSTEM

TECHNICAL FIELD

This invention relates generally to devices for preventing the accumulation of debris in the ground engaging systems of vehicles and more particularly to apparatus for preventing the accumulation of mud, snow and other debris in roadable track systems.

BACKGROUND ART

Vehicles which travel through adhering materials such as mud, freezing slush and the like suffer detrimental accumulation of these materials on their ground engaging portions. This problem is especially troublesome in vehicles having an endless track system rather than wheels alone. Adhering materials tend to accumulate on the inside surface of the endless track at which location they may subsequently be drawn between a wheel and/or idler of the endless track system and the endless track. This can result in packing of debris between the wheel and the endless track and impose potentially destructive tensions on the endless track and/or the supporting elements. Additionally, an accumulation of debris on the endless track system can increase the resistance to free movement of the endless track system and render the vehicle less powerful and efficient.

Many schemes have been devised to avoid or mitigate these problems. Certain endless track systems incorporate shields to substantially eliminate the intrusion of foreign material. More typically, endless tracks include devices for removing debris that has already accumulated on some portion of the system.

In U.S. Pat. No. 3,861,762 issued to Freddy on Jan. 21, 1975, a guard and scraper for an idler wheel is disclosed. This device serves to remove debris that accumulates on an idler of an endless track system. Disadvantageously, at least a certain portion of the debris removed from the idler is permitted to fall back within the track system.

U.S. Pat. No. 1,130,117, issued to Strait on Mar. 2, 1915, discloses inclined shields supported beneath the upper portion of an endless chain of a track system. These shields deflect away from the track system any debris falling from the upper portion of the endless chain. These shields do not appear to assist in removing debris from the head surface of a wheel supporting the endless chain.

Further disadvantageous is that existing shields are generally fabricated from substantially rigid metallic plates. In cold conditions, slush and snow can freeze on these shields and form a bulky mass which tends to affect performance of the vehicle.

The present invention is directed to overcoming one or more of the problems as set forth above.

DISCLOSURE OF THE INVENTION

In one aspect of the present invention, an endless track assembly has a front wheel and a rear wheel. A deflector is positioned between these wheels and is of a construction sufficient for scraping away debris adhering to at least one of these wheels. Additionally, the deflector has at least one surface inclined so as to deflect any debris falling on that surface out of and away from the endless track system.

BRIEF DESCRIPTION OF THE DRAWINGS

FIG. 1 is a diagrammatic side elevational view of an embodiment of the present invention; and FIG. 2 is a partially broken away sectional view taken along line II—II of FIG. 1.

BEST MODE FOR CARRYING OUT THE INVENTION

Referring more particularly to the drawings, an endless track assembly embodying the principles of the present invention is generally indicated by the reference number 10. In the preferred embodiment, the endless track assembly 10 is of the roadable track type; that is, suited for use on roads.

As shown in FIG. 1, the endless track assembly 10 has an endless track 12 such as an elastomeric roadable belt. The endless track 12 encircles four wheels 14,16 arranged as tandem pairs, for example. Each wheel 14,16 has a tread surface 18 for contacting an inner surface 20 the endless belt 12. The endless belt 12 also has an outer surface 22 which has grousers 25 for improved traction. Preferably, both the front wheels 14 and the rear wheels 16 are pneumatic tires. The wheels 14,16 are, of course, mounted on axles (not shown) which are connected to a vehicle 24 such as a motor grader. The present invention is also suited for use in certain other types of vehicles having tandem wheels.

As shown in FIG. 2 a support member 26 is mounted on the vehicle 24 and projects to a position between the front and rear wheels 14,16. Preferably, this support member 26 is a beam or bar cantilevered from a plurality of bosses 28 which are attached by bolts or other means to a portion of the vehicle 24. The support member 26 is substantially rigid with respect to the vehicle 24.

A deflector 30 is attached to the support member 26 and occupies a position intermediate the front and rear wheels 14,16. As best shown in FIG. 2 this deflector 30 has a lateral cross-section in the shape of an inverted "V". The deflector 30 has two substantially planar deflection portions 32 which join at an upper ridge 34 which is parallel to the longitudinal axis of the vehicle 24. The two deflection portions 32 extend downwardly and outwardly from the upper ridge 34 to form inboard and outboard edge portions 36,38 of the deflector. Between the inboard and outboard portions 36,38 is an intermediate portion 39 including the upper ridge 34. Preferably these edge portions 36,38 extend, respectively, at least as far inboard and as far outboard as any portion of the endless belt 12. It is advantageous in certain applications if the deflection portions 32 extend to a position elevationally near that portion of the endless belt 12 in contact with the ground.

The deflector 30 has a front edge portion 40 and a rear edge portion 42. The front edge portion 40 is adjacent the tread surface 18 of the front wheels 14 and spaced therefrom by a first gap 44. The rear edge portion 42 is adjacent the tread surface 18 of the rear wheels 16 and spaced therefrom by a second gap 46. Preferably the front and rear edge portions 40,42 are of a concave configuration extending along the surface of the wheels 14,16. The gap 46 between the deflector 30 and the rear wheels 16 is preferably no less than 1 cm and no greater than 3 cm. The intersection of the upper ridge 34 and the rear edge portion 42 should be substantially as close to the tread surface 18 of the rear wheels 16 as is any other point on the rear edge portion.

The deflector 30 is constructed of material permitting a degree of flexibility. This flexibility must be sufficient so that vibrations induced in the deflector 30 by motion of the vehicle 24 or by debris striking the deflector 30 will cause sufficient deformation of the deflection portions 32 to shake accumulated ice, mud and other debris free from adhesion to the deflection portions 32. Preferably, abrasion resistant tread-type rubber is used for the deflection portions 32. As shown in FIG. 2, the deflector can be fashioned of a single sheet of such rubber folded to form the inverted "V" shape. For certain applications supportive metal backing may be necessary under the upper ridge 34 and/or the front and rear edge portions 40,42. The deflector 30 can be coated with Teflon or a similar low-friction surface to reduce adhesion of debris to the deflector 30.

As shown in FIG. 2 the deflector 30 is mounted on the vehicle 24 by passing the support member 26 through spaced apertures 50 in the deflection portions 32. Annular metal plates 52 are placed on either face of each of the two deflection portions 32 so as to improve the structural strength of the apertures 50. These plates 52 are bolted one to the other. The support member 26 extends to the ouboardmost deflection portion 32 and an attachment bolt 48 passing through the outermost metal plate 52 into the support member 26 serves to join the deflector 30 to the support member 26.

INDUSTRIAL APPLICABILITY

The incorporation of the present invention on an appropriate endless track vehicle yields significant operational advantages. While the preferred embodiment of the present invention is especially suited for use in roadable endless track systems such as those of certain motor graders, with alterations apparent to those skilled in the art, the present invention could advantageously be incorporated on certain other vehicles having endless track systems.

The deflector 30 serves a number of useful functions. In operation of an endless track vehicle through mud, snow or other adhering materials, an amount of this material collects on the inner surface 20 of the endless belt 12. During movement of the vehicle 24 the belt 12 passes around the rear wheel 16 to a downwardly facing position causing some or all of the material to fall. The falling material strikes the deflector 30 and is diverted downwardly and outwardly along the deflection portions 32. The material then fall outside of the endless track system 10 rather than falling on the belt 12, and an accumulation of material on the belt 12 is prevented.

The deflector 30 also forms a partial shield assisting in preventing the intrusion of debris. For example, in the absence of the deflector 30, were the motor grader to run along a snowbank a great amount of snow could fall into the endless track system 10. With the deflector 30, however, this is prevented by the outboard deflection portion 32 shielding against entry of much of the snow.

The front and rear edge portions 40,42 of the deflector 30 are positioned to function as scrapers for removing material adhering to tread surfaces 18 of the wheels 14,16. The edge portions 40,42 are concave so as to follow the contour of the wheel tread surfaces 18 for effecient removal of accumulated material. The rear edge portion 42 is streamlined with respect to the direction of movement of the rear wheel 16 for especially efficient removal of accumulated material.

The fabrication of the deflection surfaces 32 from rubber or some other somewhat flexible substance provides a distinct benefit to the deflector 30. As debris is scraped onto the deflector 30 from the wheel tread surfaces 18 or falls onto the deflector 30 from above, the entire deflector 30 will undergo an amount of surface distortion. This tends to free material that has adhered to the deflector and deflects it to the ground. This is especially advantageous in freezing conditions as snow, slush, mud and the like has a tendency to freeze on those parts with which it comes in contact. The use of rubber in the deflector 30 also makes less likely the freezing of liquid materials contacting the deflector 30 than would be the case were metal utilized.

The deflector is removably mounted to the support member 26. This is beneficial in that it permits simple interchangeability and maintenance of deflectors 30. The support member 26 also structurally strengthens the deflector 30 by fixing the locations of the apertures 50 with respect to the vehicle 24.

Other aspects, objects, advantages and uses of the present invention can be obtained from a study of the drawings, the disclosure and the appended claims.

We claim:

1. In an endless track assembly (10) adapted for use on a vehicle (24), said endless track assembly (10) including a front pneumatic wheel (14) having a tread surface (18), a rear pneumatic wheel (16) having a tread surface (18), and an endless track (12) encircling said wheels (14,16), the improvement comprising a deflector (30) adapted for attachment to said vehicle (24), said deflector (30) having:
   a front edge portion (40) adjacent the thread surface (18) of the front wheel (14);
   a rear edge portion (42) adjacent the tread surface (18) of said rear wheel (16), one of said front and rear edge portions (40,42) being adapted for scraping accumulations of debris from the corresponding one of said wheel tread surfaces (18);
   a deflection portion (32) defining an upper surface of said deflector (30), said deflection portion (32) being fashioned of an elastomeric material and being adapted to undergo flexure in response to at least one of scraping debris from one of said wheel tread surfaces (18) and movement of said vehicle (24);
   an inboard portion (36);
   an outboard portion (38); and,
   an intermediate portion (39), said intermediate portion (39) being elevated above one of the inboard portion (36) and the outboard portion (38).

2. The endless track assembly (10), as set forth in claim 1, wherein said deflection portion (32) is constructed of rubber.

3. The endless track assembly (10), as set forth in claim 1, wherein at least one of the front edge portion (40) and the rear edge portion (42) is concave.

4. The endless track assembly (10), as set forth in claim 1, wherein the rear edge portion (42) is spaced from the tread surface (18) of said rear wheel (16) a distance in the range of about 1–3 cm.

5. The endless track assembly (10) as set forth in claim 1 wherein said deflector (30) forms, in lateral cross section, an inverted "V".

6. The endless track assembly (10) of claim 1 wherein said endless track (12) is a roadable belt and said wheels (14,16) are pneumatic.

7. In a vehicle (24) having an endless track assembly (10), said endless track assembly (10) including a tandem pair of front wheels (14) each having a tread surface (18), a tandem pair of rear wheels (16) each having a tread surface (18), both of said wheels (14,16) being axled to said vehicle (24), and an endless track (12) encircling said pairs of wheels (14,16), the improvement comprising an elastomeric deflector (30) removably attached intermediate said wheels (14,16) by a support member (26) projecting from said vehicle (24), said deflector (30) having:

a front edge portion (40) adjacent the tread surface (18) of the tandem pair of front wheels (14), a rear edge portion (42) adjacent the tread surface (18) of said tandem pair of rear wheels (16), one of said front and rear edge portions (40,42) being adapted for scraping accumulations of foreign matter from the corresponding one of said wheel tread surfaces (18);

a deflection portion (32) defining an upper surface of said deflector (30), said deflection portion (32) being fashioned of an elastomeric material and being adapted to undergo flexure in response to at least one of scraping of one of said wheel tread surfaces (18) and movement of said vehicle (24);

an inboard portion (36);

an outboard portion (38); and, an intermediate portion (39), said intermediate portion (39) being at an elevation higher than one of the inboard portion (36) and the outboard portion (38).

8. A deflector (30) adapted for removing debris from an endless track assembly (10) which has a front wheel (14) with a tread surface (18), a rear wheel (16) with a tread surface (18) and an endless track (12) encircling said wheels (14,16), said deflector (30) comprising:

a front edge portion (40);

a rear edge portion (42) of a construction and configuration sufficient for removing debris from said rear wheel tread surface (18);

a deflection portion (32) defining an upper surface of said deflector (30), said deflection portion (32) being fashioned of an elastomeric material and being adapted to deflect in response to at least one of scraping of debris from one of said wheel tread surfaces (18) and movement of said vehicle (24);

a first portion (36);

a second portion (38); and, an intermediate portion (39) intermediate said first and second portions (36,38) and being at an elevation greater than one of said first and second portions (36,38).

9. The deflector (30), as set forth in claim 8, wherein said front edge portion (40) is of a construction sufficient for removing debris from said front wheel (14).

10. The deflector (30), as set forth in claim 9, wherein said deflecting portion (32) is formed of rubber.

* * * * *